United States Patent
Evans

(10) Patent No.: US 9,376,730 B2
(45) Date of Patent: Jun. 28, 2016

(54) PRODUCTION OF IRON

(75) Inventor: Timothy James Evans, Bargo (AU)

(73) Assignee: Technological Resources PTY. Limited, Melbourne, Victoria (AU)

( * ) Notice: Subject to any disclaimer, the term of this patent is extended or adjusted under 35 U.S.C. 154(b) by 342 days.

(21) Appl. No.: 13/883,173

(22) PCT Filed: Nov. 3, 2011

(86) PCT No.: PCT/AU2011/001404
§ 371 (c)(1),
(2), (4) Date: Jul. 3, 2013

(87) PCT Pub. No.: WO2012/058717
PCT Pub. Date: May 10, 2012

(65) Prior Publication Data
US 2013/0276584 A1  Oct. 24, 2013

(30) Foreign Application Priority Data
Nov. 3, 2010  (AU) .............................. 2010904887

(51) Int. Cl.
*C21B 3/00* (2006.01)
*C21B 13/00* (2006.01)
*C21B 5/06* (2006.01)

(52) U.S. Cl.
CPC ... *C21B 3/00* (2013.01); *C21B 5/06* (2013.01); *C21B 13/00* (2013.01); *C21B 2100/02* (2013.01); *Y02P 10/122* (2015.11); *Y02P 10/128* (2015.11); *Y02P 10/132* (2015.11); *Y02P 10/136* (2015.11); *Y02P 10/283* (2015.11)

(58) Field of Classification Search
CPC ...... C21B 3/00; C21B 2100/02; C21B 13/00; Y02C 10/06
See application file for complete search history.

(56) References Cited

U.S. PATENT DOCUMENTS

| | | | |
|---|---|---|---|
| 4,111,687 A * | 9/1978 | Syska | .......................... 75/10.38 |
| 4,202,534 A | 5/1980 | Davis, Jr. | |
| 4,248,624 A * | 2/1981 | Novoa | .................... C21B 5/008 75/472 |
| 4,556,417 A * | 12/1985 | Martinez-Vera et al. | ....... 75/496 |
| 4,897,113 A | 1/1990 | Becerra-Novoa et al. | |
| 5,238,487 A | 8/1993 | Hauk et al. | |

(Continued)

FOREIGN PATENT DOCUMENTS

WO   2005116275 A2   12/2005

OTHER PUBLICATIONS

Golomb, Dan and Angelopoulos, Anastasios. Greenhouse Gas Control Technologies: Proceedings of the Fifth International Conference on Greenhouse Gas Control Technologies. "A Benign Form of CO2 Sequestration in the Ocean." 2001. Downloaded on Oct. 19, 2015 from https://www.netl.doe.gov/publications/proceedings/01/carbon_seq/p55.pdf.*

(Continued)

*Primary Examiner* — George Wyszomierski
*Assistant Examiner* — Tima M McGuthry Banks
(74) *Attorney, Agent, or Firm* — Banner & Witcoff, Ltd.

(57) ABSTRACT

A two stage ironmaking process includes a first stage that includes solid state reduction of iron ore and producing a partially-reduced iron-containing feed material and an off-gas containing $CO_2$ at a location that is in close proximity to a site for sequestering $CO_2$. A second stage of the process includes transporting the feed material to an ironmaking facility iron at another location and producing iron from the feed material.

14 Claims, 1 Drawing Sheet

(56) References Cited

U.S. PATENT DOCUMENTS

| | | | |
|---|---|---|---|
| 5,437,708 A * | 8/1995 | Meissner | C21B 13/02 266/140 |
| 5,445,363 A * | 8/1995 | Becerra-Novoa et al. | 266/182 |
| 2009/0051083 A1* | 2/2009 | Vrech et al. | 266/176 |
| 2013/0171049 A1* | 7/2013 | Metius et al. | 423/210 |

OTHER PUBLICATIONS

International Search Report mailed Nov. 28, 2011 (PCT/AU2011/001404); ISA/AU.

* cited by examiner

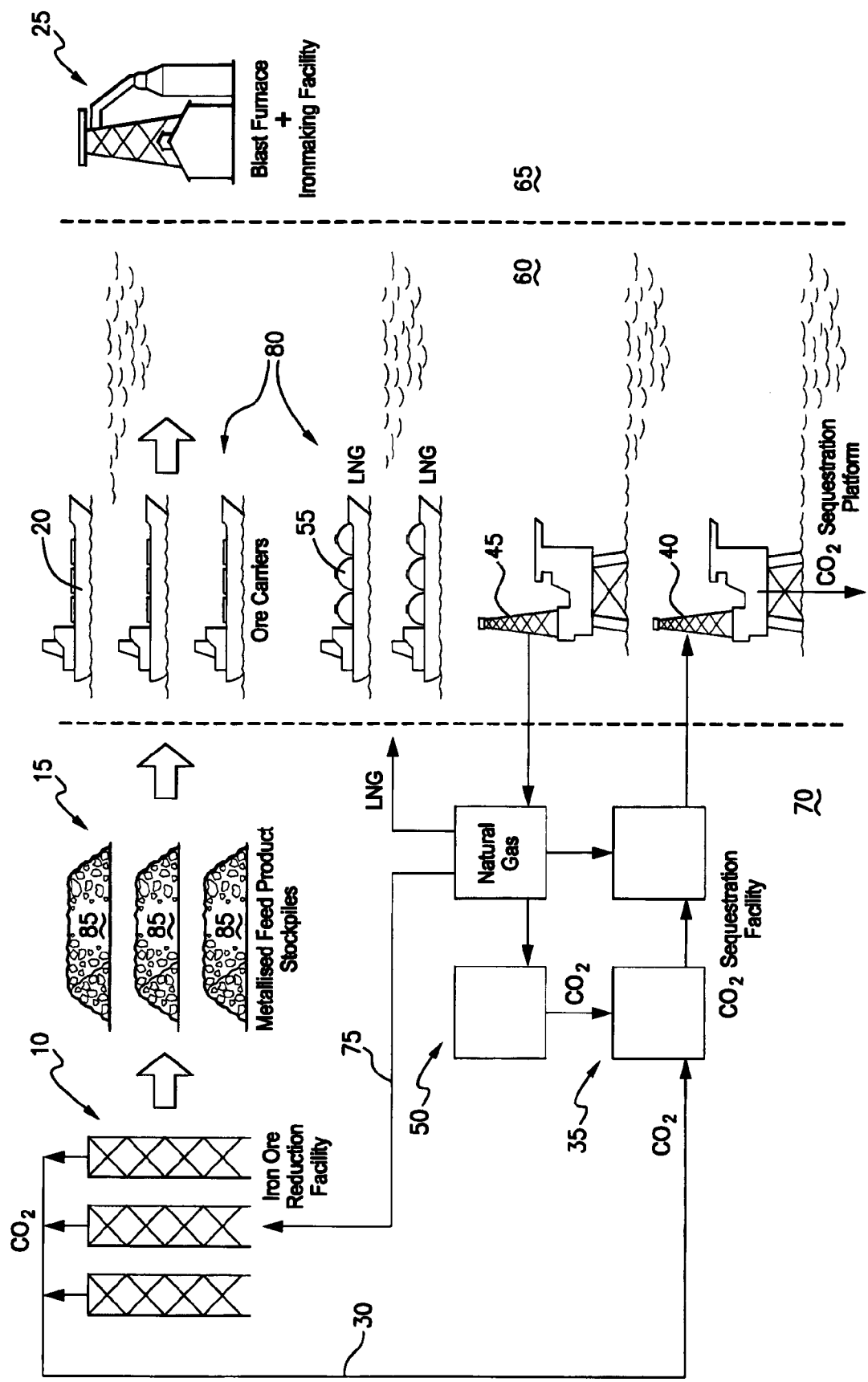

PRODUCTION OF IRON

The present application is a U.S. National Phase filing of International Application No. PCT/AU2011/001404, filed on Nov. 3, 2011, designating the United States of America and claiming priority to Australia Patent Application No. 2010904887, filed Nov. 3, 2010, and this application claims priority to and the benefit of both the above-identified applications, which are both incorporated by reference herein in their entireties.

TECHNICAL FIELD

The present invention relates to producing iron from iron ore.

BACKGROUND

The term "iron ore" is understood herein to mean mined material that includes iron oxides. The term also covers mined material that contains other valuable metals. For example, the term covers mined material that contains iron oxides and titanium oxides.

The present invention relates particularly, although by no means exclusively, to producing iron from iron ore having a gangue content of at least 5% by weight on a dry basis.

The present invention relates more particularly, although by no means exclusively, to producing iron from iron ore with minimal $CO_2$ emissions.

Blast furnaces are the most widely-used option for producing iron from iron ore. Ironmaking and downstream steelmaking processes make a substantial contribution to $CO_2$ emissions in the world.

At present there is no readily available substitute to carbon for the production of iron from iron ore. For example, there is no commercially-available ironmaking process that can utilise electric current in the reduction process. This means that nuclear and hydro power cannot be used as an alternate source of energy for the reduction of iron oxides to iron. As a result, sequestration of $CO_2$ emissions is presently the most promising process for reducing $CO_2$ emissions from the ironmaking process.

Pellets can be used in blast furnaces as a substitute for lump and sintered iron ore. Typical blast furnace pellets have less than 5% by weight of gangue. They are manufactured from low grade iron ore (i.e. iron ore with a gangue content greater than 5% by weight) that has been finely ground in order to separate the gangue material from the iron oxides. Low gangue pellets have lower coking coal consumption in blast furnaces compared with the use of higher gangue content pellets in blast furnaces. However, the use of pellets with less than 5% by weight gangue does not appreciably reduce the overall $CO_2$ emissions of the ironmaking process due to the energy involved in grinding and producing the pellets. It should however be noted that, overall, the use of pellets as a feed stock for a blast furnace can be economic where low cost energy and low cost (high gangue) iron ores are available.

Electric arc steelmaking processes are designed to convert scrap steel to molten metal and do not offer significant opportunities for reducing $CO_2$ emissions from the conversion of iron ores to iron in the ironmaking process. Electric arc furnaces can receive some raw materials, which typically are provided to dilute the impurities present in the scrap metal (such as copper and zinc). These raw materials must be of very low gangue content (typically less than 2% on a dry weight basis) so as not to affect the productivity of electric arc furnaces or significantly increase the electricity consumed by the furnaces (due to the increased need to heat gangue materials to the molten state).

One proposal to reduce the $CO_2$ emissions from blast furnaces is to capture the $CO_2$ emissions at the blast furnaces and to sequester these emissions in underground reservoirs. However, blast furnaces are fired using heated air (hot blast) and, as a result, the off-gas of a blast furnace has a high percentage of $N_2$ which has to be stripped from the off-gas using large volume gas handling equipment before the $CO_2$ can be sequestered. Such large volume gas handling equipment is expensive, and it is likely that it will be necessary to develop oxygen-fired blast furnaces (as alternatives to air-fired blast furnaces) before sequestration of $CO_2$ from blast furnaces will be economically viable.

A further difficulty with sequestration of $CO_2$ from blast furnaces arises where a blast furnace is not situated in close proximity to a suitable sequestration site. In this situation, there may be a requirement to transport the captured $CO_2$ over thousands of kilometers of pipe line. Such pipe lines will need to be specially installed and may represent a cost to the ironmaking process that means that it is no longer economically viable.

The cost of replicating existing iron and steelmaking facilities adjacent suitable sequestration sites could, in many cases, equal or exceed the cost of installing $CO_2$ pipelines. Moreover, simply replicating blast furnaces at suitable sequestration sites will not result in a maximum of $CO_2$ savings as it will be necessary to solidify the molten iron to pig iron before transporting it to steelmaking facilities in other locations. This will result in additional $CO_2$ emissions at the steelmaking facilities when the pig iron is reheated to its molten state for conversion to steel.

The above difficulties mean that an economically viable ironmaking/steelmaking process with $CO_2$ sequestration may be difficult to achieve in practice notwithstanding that $CO_2$ sequestration of blast furnace off-gas may itself be technically feasible.

The above description is not to be taken as an admission of the common general knowledge in Australia or elsewhere.

BRIEF SUMMARY

The present invention is based on a realisation that $CO_2$ sequestration in an ironmaking process may be economically viable if the ironmaking process is split into two stages, where a first stage includes solid state reduction of iron ore and producing a partially-reduced iron-containing feed material and an off-gas containing $CO_2$ at a location that is in close proximity to a site for sequestration of $CO_2$, and a second stage includes transporting the feed material to an ironmaking facility iron at another location and producing iron from the feed material.

More particularly, the present invention provides an ironmaking process that includes:

(a) a first stage which includes:

(i) reducing iron ore in a solid state in a solid state reduction facility and producing a partially-reduced iron-containing feed material and an off-gas containing $CO_2$, with the solid state reduction facility being situated at a location that is in close proximity to a site for sequestering $CO_2$, (ii) collecting $CO_2$ gas produced during the solid state reduction of iron ore; and (iii) sequestering the $CO_2$ gas; and (b) a second stage which includes transporting the feed material from the first stage to an ironmaking facility and producing iron.

The first stage may include reducing iron ore in the solid state reduction facility and producing the feed material with a metallisation of at least 50%.

The term "metallisation" of an iron ore feed is understood herein to mean the percentage of the iron oxides in the iron ore feed that is reduced to metallic iron.

The first stage may include reducing iron ore and producing the feed material with a metallisation of at least 50%.

The first stage may include reducing iron ore and producing the feed material with a metallisation of at least 55%.

The first stage may include reducing iron ore and producing the feed material with a metallisation of at least 60%.

The first stage may include reducing iron ore and producing the feed material with a metallisation of between 60% and 85%.

The first stage may include producing the feed material with a metallisation of between 60% and 85% and a gangue content of greater than 5% by weight.

The gangue content may be greater than 6% by weight.

The gangue content may be greater than 7% by weight.

The first stage may include producing the feed material from iron ore in the form of iron ore fines having a gangue content of 6% or greater on a dry weight basis and the feed material having a metallisation of between 60% and 85%.

The first stage may include forming the partially-reduced iron ore fines produced by the solid state reduction into feed material particles of a size of at least 4 cm$^3$.

The gangue content of the particles may be greater than 7% by weight.

The gangue content of the particles may be greater than 8% by weight.

The solid state reduction facility used in the first stage may be situated at a location remote from the ironmaking facility used in the second stage.

The first stage may include treating off-gas produced in the solid state reduction facility and producing a $CO_2$ off-gas.

The $CO_2$ content of the $CO_2$ off-gas may exceed 90% by volume of the off-gas.

The $CO_2$ content of the $CO_2$ off-gas may exceed 95% by volume of the off-gas.

The $CO_2$ content of the $CO_2$ off-gas may exceed 99% by volume of the off-gas.

The $CO_2$ off-gas may have less than 10% $N_2$ by volume.

The $CO_2$ off-gas may have less than 5% $N_2$ by volume.

The $CO_2$ off-gas may have less than 2% $N_2$ by volume.

The $CO_2$ off-gas may have less than 1% $N_2$ by volume.

The $CO_2$ off-gas may have greater than 90% by volume of $CO_2$ and less than 10% $N_2$.

The $CO_2$ off-gas may have greater than 95% by volume $CO_2$ and less than 5% by volume $N_2$.

The $CO_2$ off-gas may have greater than 99% by volume $CO_2$ and less than 1% by volume $N_2$.

The first and the second stages may be carried out at locations that are separated by a considerable distance.

The solid state reduction facility used in the first stage may be more than 1000 km from the ironmaking facility used in the second stage.

The solid state reduction facility may be located in close proximity to a facility for producing a gas from natural gas, and the first stage may include using the natural gas from the gas production facility as a reductant for reducing iron ore in the first stage.

The solid state reduction facility may be less than 1000 km from a sequestration facility for sequestering the $CO_2$ off-gas produced in the first stage.

The solid state reduction facility may be less than 700 km from the sequestration facility.

The solid state reduction facility may be less than 1000 km from the sequestration facility and more than 1000 km from the ironmaking facility.

The gangue content of the iron ore for the first stage may be at least 7% by weight on a dry basis.

The gangue content of the iron ore for the first stage may be at least 8% by weight on a dry basis.

The first stage may be a fluid bed process.

In that event, typically, the iron ore for the first stage is in the form of fines and a reductant for the first stage is a reducing gas.

The reducing gas may be natural gas or a syngas.

The term "fines" is understood herein to mean iron ore particles of a size that are typically fed to sinter plants at a blast furnace facility and typically are particles of iron ore that are less than 8 mm and typically 6.3 mm or less.

In addition, the first stage may include forming briquettes or other forms of agglomerates of partially-reduced iron ore fines produced in the solid state reduction facility in the first stage and supplying the briquettes or other agglomerates to the ironmaking facility used in the second stage.

The briquetting or agglomeration step may produce briquettes or agglomerates having a volume that is greater than 4 cm$^3$.

The briquetting or agglomeration step may produce briquettes or agglomerates having a volume that is greater than 6 cm$^3$.

The briquetting or agglomerating step may produce briquettes or agglomerates having a volume that is greater than 4 cm$^3$ and less than 8 cm$^3$.

The first stage may be a shaft furnace-based process for lump iron ore.

The volume of the lump iron ore may be greater than 4 cm$^3$.

The volume of the lump iron ore may be greater than 6 cm$^3$.

The volume of the lump iron ore may be in a range greater than 4 cm$^3$ and less than 8 cm$^3$.

A reductant for the first stage may be a solid or a gas reductant.

The solid reductant may be coal.

The gas reductant may natural gas or a syngas.

The present invention also provides a first stage of a two stage process for producing molten iron with minimal $CO_2$ emissions, with the first stage including:

(a) reducing iron ore having a gangue content of greater than 6% by weight on a dry basis in a solid state and producing a partially-reduced iron-containing feed material having a metallisation degree of 85% or less and an off-gas containing $CO_2$ in a solid state reduction facility at a location in the vicinity of a $CO_2$ sequestration facility;

(b) capturing $CO_2$ released from the solid state reduction facility and transporting the $CO_2$ to the $CO_2$ sequestration facility and sequestering the $CO_2$;

(c) stockpiling the partially-reduced iron-containing feed material produced in the solid state reduction facility;

(d) reclaiming the stockpiled partially-reduced iron-containing feed material for transportation to an ironmaking facility such as a blast furnace located remotely from the solid state reduction facility.

The iron ore may be lump ore or fines, as described above.

In the event that the iron ore is in the form of fines, the first stage may include forming briquettes or other forms of agglomerates of partially-reduced iron ore fines produced in the solid state reduction facility in the first stage and then stockpiling the briquettes or other agglomerates and ultimately transporting the briquettes to the ironmaking facility.

The present invention also provides a process for producing a metallised iron product in a solid state reduction facility for transportation to an ironmaking facility such as a blast furnace located remotely from the solid state reduction facility, the process including:

(a) supplying lump iron ore with gangue of at least 6% on a dry weight basis to the solid state reduction facility, the lump iron ore having a nominal volume of 4 cm$^3$ or greater;

(b) reducing the iron ore to greater than 60% and equal to or less than 85% metallisation in the solid state reduction facility and producing a metallised lump iron product and an off-gas having greater than 90% $CO_2$; and (c) stockpiling the metallised lump iron product for transportation to the ironmaking facility.

The process may include transporting the off-gas to a $CO_2$ sequestration facility and sequestering $CO_2$ in the facility.

The present invention also provides an apparatus for producing iron from iron ore with minimal $CO_2$ emissions including, a solid state reduction facility for reducing iron ore having a gangue content of at least 6% by weight on a dry basis to less than 80% metallisation, and an ironmaking facility for completing reduction of partially reduced iron ore from the solid state reduction facility and producing molten iron.

The solid state reduction facility and the ironmaking facility may be at locations that are separated by a considerable distance.

The solid state reduction facility may be more than 1000 km from the ironmaking facility.

The solid state reduction facility may be located in close proximity to a facility for producing a gas from natural gas for use as a reductant in the solid state reduction facility.

The solid state reduction facility may be less than 1000 km from a sequestration facility for sequestering $CO_2$ produced in the solid state reduction facility.

The solid state reduction facility may be less than 700 km from the sequestration facility.

The solid state reduction facility may be less than 1000 km from the sequestration facility and more than 1000 km from the ironmaking facility.

The ironmaking facility may include a blast furnace.

The ironmaking facility may be a part of an integrated steelmaking facility.

The present invention may also include a steelmaking process comprising making steel from iron produced in the above-described ironmaking process.

BRIEF DESCRIPTION OF THE DRAWING

The present invention is described in more detail hereinafter by way of example only with reference to the accompanying drawing, in which:

FIG. 1 is a diagram of one embodiment of a two stage process and apparatus for producing molten iron from fines iron ore in accordance with the present invention.

DETAILED DESCRIPTION

The following description is in the context of reducing fines iron ore having a gangue content of at least 5% by weight on a dry basis, more typically at least 6% by weight on a dry basis. It is noted that the present invention is not so limited and also extends to producing iron from lump iron ore.

In the embodiment, iron ore fines and natural gas 75 (or coal) are supplied to a solid state reduction facility 10, typically in the form of a fluidised bed facility, such as a Circored and Circofer (available from Outotec) or Finmet furnace (available from Siemens VAI of Germany).

The facility 10 is operated under standard conditions and the iron ore is partially reduced to a metallisation of greater than 65% and less than 85%.

The natural gas 75 is produced in a gas processing plant 50 that treats natural gas from onshore or offshore production wells 45.

The facility 10 discharges a partially metallised fines product 15 which is subsequently agglomerated or compacted to form a lump product 15 suitable for use as a feed material for an ironmaking facility in the form of a blast furnace 25.

The partially metallised lump product 15 is stored in stockpiles 85 that are proximate a port facility 80. Ore carriers 20 located at the port 80 transport the partially metallised feed material 15 to a port proximate the blast furnace 25.

The facility 10 also produces an off-gas 30 that contains $CO_2$. The off-gas 30 is transferred to a $CO_2$ sequestration facility 35. The $CO_2$ in the off-gas is sequestered by $CO_2$ sequestration platform 40.

Together, the solid state metallisation process and the $CO_2$ sequestration process form a first stage of on one embodiment of a two stage ironmaking process in accordance with the present invention.

The second stage of the process includes at least a blast furnace or another ironmaking facility located remotely from the first stage. The ironmaking facility may be a part of an integrated ironmaking and steelmaking facility.

The gas processing plant 50 may also produce a $CO_2$-containing off-gas and this off-gas may also be transferred to the $CO_2$ sequestration platform 40.

In accordance with this embodiment of the present invention, the location for facility 10 is selected to be proximate a suitable $CO_2$ sequestration facility 35. Typically, the facility 10 and the sequestration facility may be within 500 km of each other. Such a sequestration facility may be proximate to and/or part of a fuel gas production plant 50. This selection of the location of the facility 10 facilitates sequestering $CO_2$ 30 produced in the facility 10 so as to reduce emissions of $CO_2$ from the two stage ironmaking process.

The partially metallised feed material is transferred from the stockpile 15 to a blast furnace 25 and processed in the blast furnace to complete metallisation and melting of the feed product 15 and production of molten iron.

The blast furnace 25 is located remotely from the facility 10 and the stockpile 15 used in the first stage. Typically, the blast furnace 25 is located at least 1000 km from the facility 10 and the stockpile 15. Hence, it is necessary to transport the partially metallised feed material typically by train and/or ship 20 to the blast furnace 25.

As is indicated above, the selection of the location of the facility 10 to be close to the $CO_2$ sequestration facility facilitates processing and sequestration of $CO_2$ produced in the facility 10. This reduces $CO_2$ emissions from the overall iron making process.

Many modifications may be made to the embodiment of the process and the apparatus of the present invention described in relation to the diagram without departing from the spirit and scope of the invention.

Whilst the embodiment is described in the context of producing iron from fines iron ore, the present invention is not so limited and extends to producing iron from lump iron ore.

Whilst the embodiment includes using natural gas as the reductant in the first stage, the present invention is not so limited and extends to the use of other gases as the reductant and to the use of coal or other forms of solid carbonaceous material as the reductant in the first stage.

Whilst the embodiment includes sequestering $CO_2$ in the off-gas produced in the solid state reduction facility 10, the present invention is not so limited and extends generally to treating off-gas from the facility 10 to remove $CO_2$ from the off-gas. The treatment may include removing $CO_2$ from the off-gas, for example by an amine scrubber treatment or the use of a vacuum-pressure swing adsorption system.

The off-gas treatment may be more extensive than being focussed on $CO_2$. For example, the off-gas treatment may include converting CO to $H_2$ in the off-gas via a water gas shift reaction and using the $H_2$ as a reduction gas in the shaft furnace.

The invention claimed is:

1. An ironmaking process that includes:
    (a) a first stage which includes:
        (i) reducing iron ore in a solid state to a metallization of between 60% and 85% in a solid state reduction facility using natural gas as a reductant and producing a partially-reduced iron-containing feed material and an off-gas containing $CO_2$, with the solid state reduction facility being situated at a location that is in close proximity to a $CO_2$ sequestration facility,
        (ii) collecting $CO_2$ gas produced during the solid state reduction of iron ore; and
        (iii) processing the $CO_2$ gas in the sequestration facility, and transferring and sequestering the processed $CO_2$ gas in offshore underground natural gas fields; and
    (b) a second stage which includes transporting the feed material from the first stage to an ironmaking facility and producing iron.

2. The process defined in claim 1 wherein the first stage includes producing the feed material with a metallization of between 60% and 85% and a gangue content of greater than 5% by weight.

3. The process defined in claim 1 wherein the first stage includes producing the feed material from iron ore in the form of iron ore fines having a gangue content of 6% or greater on a dry weight basis and with the feed material having a metallization of between 60% and 85%.

4. The process defined in claim 3 wherein the first stage includes forming the partially-reduced iron ore fines into feed material particles of a size of at least 4 $cm^3$.

5. The process defined in claim 1 wherein the first stage includes treating off-gas produced in the solid state reduction facility and producing a $CO_2$ off-gas.

6. The process defined in claim 5 wherein the $CO_2$ content of the $CO_2$ off-gas exceeds 90% by volume of the off-gas.

7. The process defined in claim 5 wherein the $CO_2$ off-gas has less than 10% $N_2$ by volume.

8. The process defined in claim 1 wherein the first stage is a fluid bed process.

9. The process defined in claim 8 wherein the iron ore for the first stage is in the form of fines and a reductant for the first stage is a reducing gas.

10. The process defined in claim 8 wherein the first stage includes forming briquettes or other forms of agglomerates of partially-reduced iron ore fines as the feed material and supplying the briquettes or other agglomerates to the ironmaking facility used in the second stage.

11. The process defined in claim 10 wherein the briquetting or agglomeration step produces briquettes or agglomerates having a volume that is greater than 4 $cm^3$.

12. The process defined in claim 1 wherein the first stage is a shaft furnace-based process for lump iron ore.

13. The process defined in claim 12 wherein the volume of the lumps of lump iron ore is greater than 4 $cm^3$.

14. The process defined in claim 1 wherein the ironmaking facility includes a blast furnace.

* * * * *